(12) United States Patent
Hiasa et al.

(10) Patent No.: US 8,514,318 B2
(45) Date of Patent: Aug. 20, 2013

(54) IMAGE PICKUP APPARATUS HAVING LENS ARRAY AND IMAGE PICKUP OPTICAL SYSTEM

(75) Inventors: Norihito Hiasa, Utsunomiya (JP); Koshi Hatakeyama, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/415,905

(22) Filed: Mar. 9, 2012

(65) Prior Publication Data

US 2012/0229691 A1 Sep. 13, 2012

(30) Foreign Application Priority Data

Mar. 10, 2011 (JP) .................................. 2011-052352

(51) Int. Cl.
*H04N 5/225* (2006.01)

(52) U.S. Cl.
USPC .......................................... 348/340; 348/360

(58) Field of Classification Search
USPC .......................................... 348/340, 360, 335
See application file for complete search history.

(56) References Cited

U.S. PATENT DOCUMENTS

| | | | | |
|---|---|---|---|---|
| 2009/0140131 A1* | 6/2009 | Utagawa | ....................... | 250/226 |
| 2009/0185801 A1 | 7/2009 | Georgiev et al. | | |
| 2009/0190024 A1* | 7/2009 | Hayasaka et al. | ............. | 348/360 |
| 2010/0194921 A1* | 8/2010 | Yoshioka | .................. | 348/231.99 |
| 2011/0129165 A1* | 6/2011 | Lim et al. | ....................... | 382/255 |

FOREIGN PATENT DOCUMENTS

| | | |
|---|---|---|
| JP | 2009-105717 A | 5/2009 |
| JP | 2009-1057171 A | 5/2009 |
| WO | 2010/121637 A1 | 10/2010 |

OTHER PUBLICATIONS

Lumsdaine, et al., "Full Resolution Lightfield Rendering", Adobe Technical Report, Adobe Systems, Inc., Jan. 2008.
Georgiev, et al., "Superresolution with Plenoptic 2.0 Cameras", Optical Society of America, 2009.
Combined Search and Examination Report issued in corresponding GB 1204130.7 dated Jul. 6, 2012.
Lumsdaine & Georgiev, The Focused Plenoptic Camera, 2009 IEEE International Conference on Computational Photography, Published Apr. 16, 2009, IEEE, p. 1-8. Cited in a Combined Search and Examination Report issued in GB 1204130.7 dated Jul. 6, 2012.

\* cited by examiner

*Primary Examiner* — Tuan Ho
*Assistant Examiner* — Zhenzhen Wu
(74) *Attorney, Agent, or Firm* — Rossi, Kimms & McDowell LLP

(57) ABSTRACT

An image pickup apparatus (301) includes an image pickup element (103), a lens unit (101) configured to collect a ray from an object (201) on an image-side conjugate plane (202), and a lens array (102) that includes a plurality of lens cells, and that is disposed so that the image-side conjugate plane (202) and the image pickup element (103) are conjugate to each other, and the lens array (102) is disposed so as to meet a predetermined conditional expression.

7 Claims, 8 Drawing Sheets

IMAGE PICKUP APPARATUS HAVING LENS ARRAY AND IMAGE PICKUP OPTICAL SYSTEM

BACKGROUND OF THE INVENTION

1. Field of the Invention

The present invention relates to an image pickup apparatus having a lens array, and an image pickup optical system.

2. Description of the Related Art

Recently, it has been proposed for image pickup apparatus to perform calculations using data obtained by an image pickup element and to perform digital image processing in accordance with the data to output various kinds of images. A "Plenoptic 2.0 Camera" that simultaneously obtains a two-dimensional light intensity distribution and parallax information on an object plane (collectively, "light field") using "Light Field Photography" is disclosed in the literature, Todor Georgiev, et al., "Full Resolution Light Field Rendering", Adobe Technical Report January 2008, and Todor Georgiev, et al., "Superresolution with Plenoptic 2.0 Camera", 2009 Optical Society of America. According to such image pickup apparatuses, a focus position of an image, a depth of field, or the like can be changed by obtaining a light field and then performing image processing after taking the image.

However, the image pickup apparatus needs to use a pixel of the image pickup element for storing the parallax information in addition to storing the two-dimensional light intensity distribution. Therefore, spatial resolution deteriorates compared to an image pickup apparatus that stores only the two-dimensional light intensity distribution. A configuration in which a certain point on an image plane formed by a main lens unit is imaged at a different pixel position by each lens (sometimes referred to as a "micro-lens") of a lens array is disclosed in the literature, Todor Georgiev, et al., "Superresolution with Plenoptic 2.0 Camera", 2009 Optical Society of America. A plurality of small images obtained in this way are reconstructed to obtain a high-resolution reconstructed image. This method of obtaining a high-resolution image is referred to as a "pixel shift effect".

However, the specific configuration that is needed in order to obtain high resolution is not disclosed in the literature, Todor Georgiev, et al., "Superresolution with Plenoptic 2.0 Camera", 2009 Optical Society of America.

SUMMARY OF THE INVENTION

The present invention provides an image pickup apparatus and an image pickup optical system that are capable of obtaining a high-resolution light field in a simple configuration.

An image pickup apparatus as one aspect of the present invention includes an image pickup element, a lens unit configured to collect a ray from an object on an image-side conjugate plane, and a lens array that includes a plurality of lens cells and that is disposed so that the image-side conjugate plane and the image pickup element are conjugate to each other, and the lens array is disposed so as to meet a predetermined conditional expression.

An image pickup optical system as another aspect of the present invention is an image pickup optical system that collects a ray from an object on an image pickup element and that includes a lens unit configured to collect the ray from the object on an image-side conjugate plane, and a lens array that includes a plurality of lens cells and that is disposed so that the image-side conjugate plane and the image pickup element are conjugate to each other, and the lens array is disposed so as to meet a predetermined conditional expressions.

Further features and aspects of the present invention will become apparent from the following description of embodiments with reference to the attached drawings.

DESCRIPTION OF THE PREFERRED EMBODIMENTS

Figure 1:
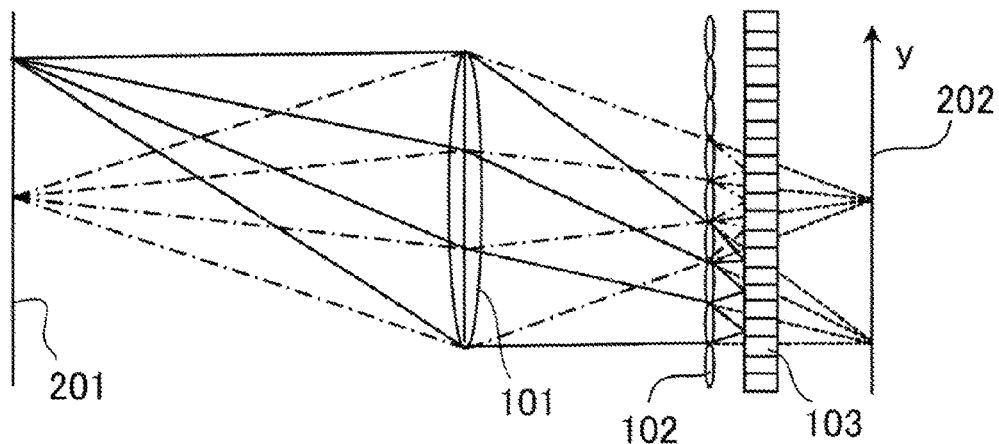
FIG. 1 is a schematic configuration diagram of the image pickup optical system in Embodiments 1, 3, and 4.

Embodiments of the present invention will be described below with reference to the accompanied drawings. In each of the drawings, the same elements will be denoted by the same reference numerals and the duplicate descriptions thereof will be omitted. Each of the embodiments of the present invention described below can be implemented solely or as a combination of a plurality of the embodiments or features thereof where necessary or where the combination of elements or features from individual embodiments in a single embodiment is beneficial.

The image pickup apparatus of the present embodiment is configured so as to obtain a light field using a lens array, and the lens array is disposed at an appropriate position to achieve an efficient high-resolution. First of all, referring to FIGS. 1 and 2, a schematic configuration of the image pickup apparatus (and an image pickup optical system that is configured by excluding an image pickup element from the image pickup apparatus) will be described. FIG. 1 is a schematic configuration diagram of an image pickup optical system in Embodiments 1, 3, and 4 described below, and FIG. 2 is a schematic configuration diagram of an image pickup optical system in Embodiment 2 described below.

Figure 2:
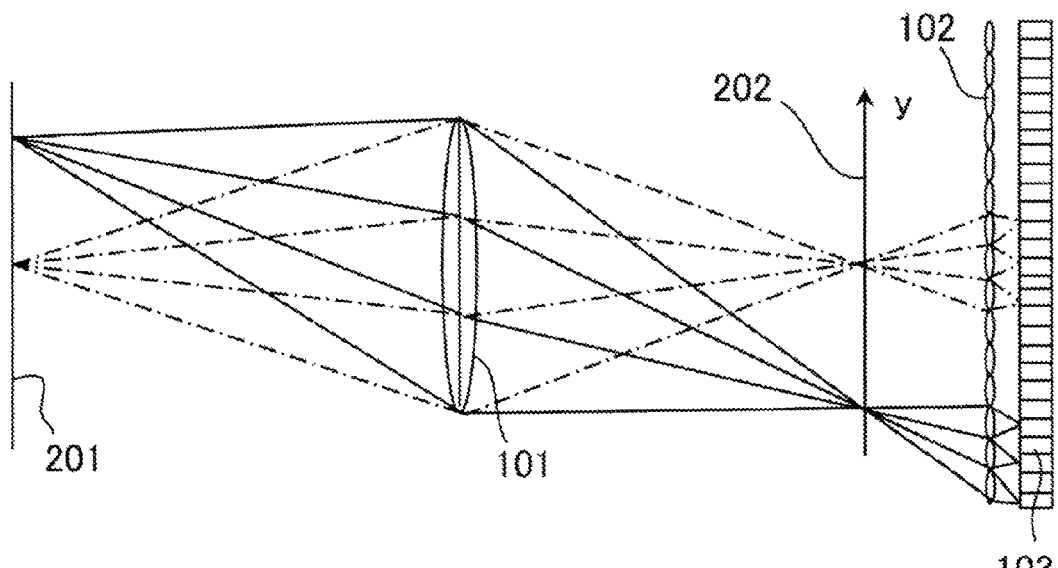
FIG. 2 is a schematic configuration diagram of the image pickup optical system in Embodiment 2.

As illustrated in FIGS. 1 and 2, the image pickup optical system has a main lens unit 101 (an optical system) that is provided with an aperture stop (not shown). In FIG. 2, a lens array 102 and an image pickup element 103 are disposed at a rear side (at an image side) of an imaging plane, i.e. an image-side conjugate plane 202 of the image lens unit 101 with respect to an object plane 201. The lens array 102 is disposed so that the image-side conjugate plane 202 of the main lens unit 101 and the image pickup element 103 correspond to a pair of conjugate planes of the lens array 102.

A ray from the object plane 201 enters the image pickup element 103 via the main lens unit 101 and the lens array 102. In this case, a real image that is formed by the main lens unit 101, i.e. that is formed by a light collection function, is reformed by the lens array 102, and it enters a plurality of different pixels of the image pickup element 103 in accordance with a position and an angle of the ray, on the object plane 201. As a result, the image pickup element 103 obtains an image that is configured by a plurality of small images which have different imaging viewpoints and imaging ranges. On the other hand, in FIG. 1, the lens array 102 is disposed at a front side relative to the imaging plane of the main lens unit 101, i.e. at an object side of an image-side conjugate plane 202 of the main lens unit 101 with respect to the object plane 201, to obtain the light field. In any cases, however, the image of the main lens unit 101 with respect to the object plane 201 is viewed as an object by the lens array 102 to be formed on the image pickup element 103, and therefore those are essentially the same.

Figure 3:
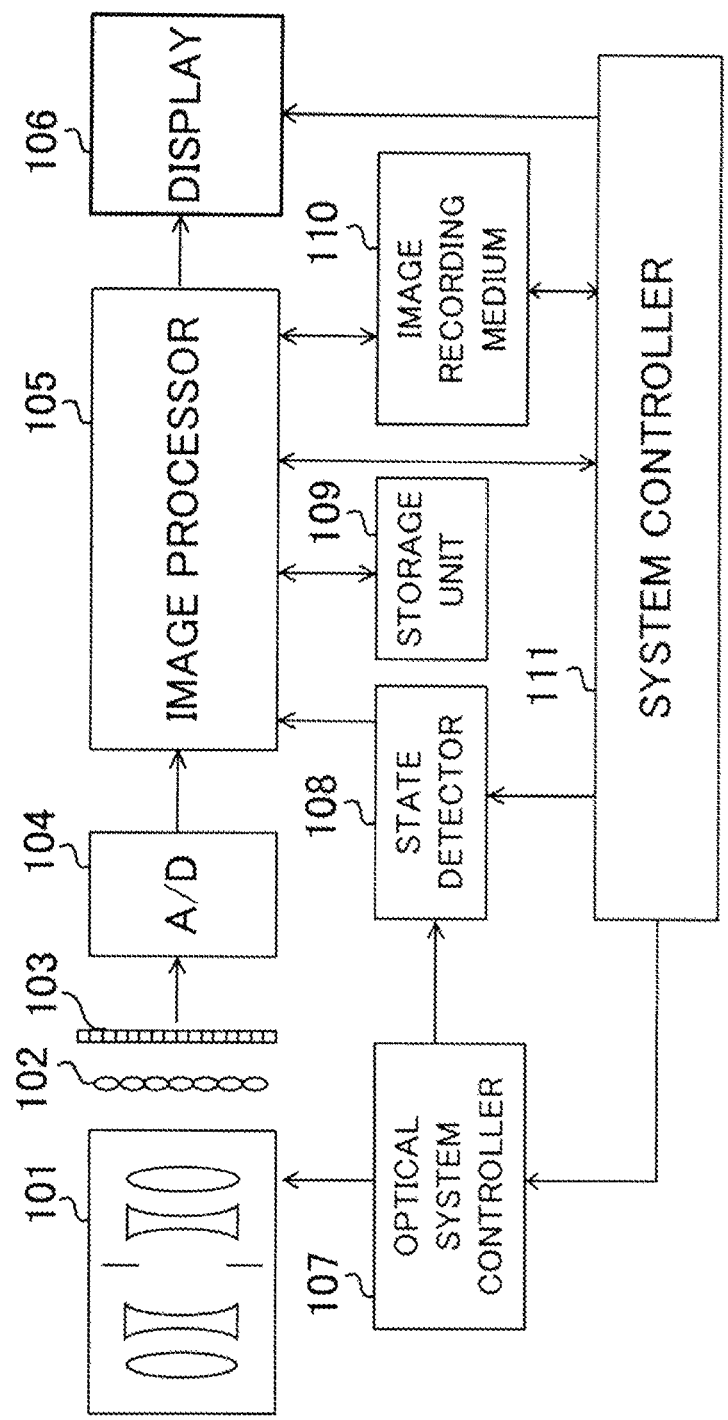
FIG. 3 is a block diagram of an image pickup apparatus in each of the present embodiments.

Next, referring to FIG. 3, a configuration of the image pickup apparatus in the present embodiment will be described. FIG. 3 is a block diagram of the image pickup apparatus in the present embodiment. The image pickup element 103 is a two-dimensional image pickup element such as a CCD (Charge Coupled Device) or a CMOS (Complementary Metal-Oxide Semiconductor). The energy of the ray that enters the image pickup element 103 via the main lens unit 101 and the lens array 102 is changed to an electric signal (an analog signal) to be converted into a digital signal by an A/D convertor 109. A predetermined processing is performed for this digital signal by an image processor 105, and the digital signal is stored in an image recording medium 110 such as a semiconductor memory in a predetermined format. In this case, image pickup condition information of the image pickup apparatus that is obtained from a state detector 108 is stored at the same time. The image pickup condition information is for example an object distance, a stop, or a focal length in a zoom lens. The state detector 108 may directly obtain the image pickup condition information from a system controller 111, or alternatively it can also obtain information related to the image pickup optical system from an optical system controller 107.

When the image stored in the image recording medium 110 is displayed on a display 106, a reconstruction processing is performed by the image processor 105 based on the image pickup condition information. As a result, an image reconstructed to be a desired viewpoint, focus position, or depth of field is displayed on the display 106. For speeding up the processing, a desired image setting such as a viewpoint, a focus, or a depth of field may also be previously stored in a storage unit 109 to directly display the reconstructed image without involving the image recording medium 110. Furthermore, the image that is recorded in the image recording medium 110 may also be a reconstructed image. The series of controls described above are performed by the system controller 111, and a mechanical drive of the image pickup optical system is performed by the optical system controller 107 in accordance with an instruction of the system controller 111.

Subsequently, an appropriate position of the lens array 102 will be described. First of all, the deterioration of the resolution in accordance with obtaining the light field is described, and next an optimal condition for obtaining the high resolution by the pixel shift effect is obtained. A condition that suppresses a sensitivity of the arrangement of the lens array 102 for the pixel shift effect is also described. For easy understanding, the following calculation is performed for a one-dimensional arrangement. The same is true for a two-dimensional arrangement.

Figure 4A:
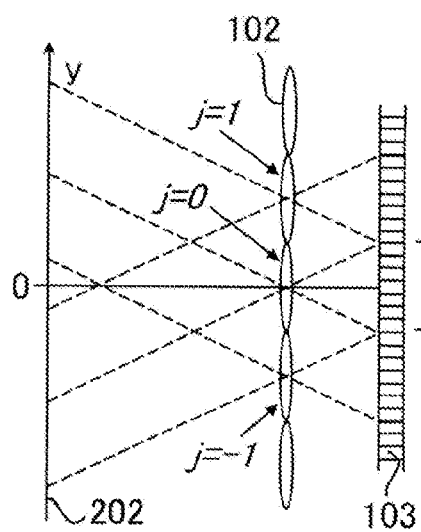
FIGS. 4A to 4C are diagrams of describing a pixel shift effect in each of the present embodiments.
Figure 4B:
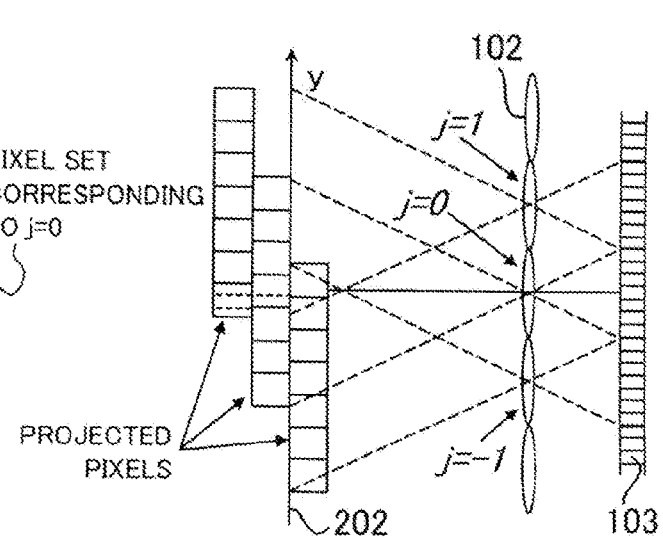
Figure 4C:
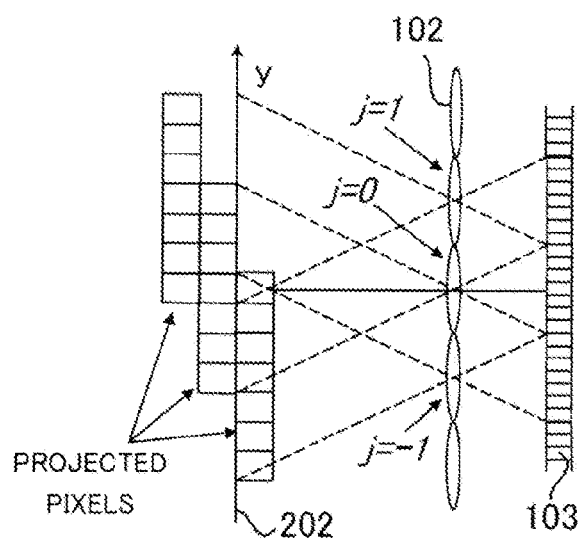

First of all, referring to FIGS. 4A to 4C, the deterioration of the resolution of the image pickup optical system that obtains the light field will be described. FIGS. 4A to 4C are diagrams of describing the pixel shift effect in the present embodiment, which is depicted by extracting a part of FIG. 2. Dashed lines in FIGS. 4A to 4C indicate angle of field with respect to each small lens, i.e. a lens cell, of the lens array 102. In a conventional image pickup optical system that obtains only a two-dimensional light intensity distribution, an image pickup element is disposed on an image-side conjugate plane of a main lens unit with respect to an object plane to take an image. In this case, the resolution of the image is equal to the number of the pixels of the image pickup element. On the other hand, in the image pickup apparatus of the present embodiment that obtains the light field, the resolution is deteriorated compared to the number of the pixels of the image pickup element.

FIG. 4B is a diagram of the projection on an image pickup plane, i.e. the image-side conjugate plane 202 of the main lens unit 101 with respect to the object plane 201, on conditions that only the two-dimensional light intensity distribution of the pixels in FIG. 4A is obtained. In the image pickup optical system of FIG. 2, the resolution that is obtained by taking an image with a pixel pitch that is enlarged by the projection is provided. The spatial resolution in this case is a value that is obtained by the magnification $|\sigma_2/\sigma_1|$ of the lens array 102 with reference to the original image pickup element 103 (the magnitude of its square in a two-dimensional distribution). In the embodiment, symbol $\sigma_1$ denotes a distance from an object-side principal plane of the lens array 102 to the image-side conjugate plane 202 of the main lens unit 101 with respect to the object plane 201, and symbol $\sigma_2$ denotes a distance from an image-side principal plane of the lens array 102 to the image pickup element 103. In order to ensure an imaging angle of field that is equivalent to the conventional image pickup optical system that images the two-dimensional light intensity distribution with the same image pickup element 103, the lens array 102 needs to be a reduction system. When an image pickup element that is equivalent to the image pickup element 103 is used for a lens array in an enlargement system, information of both the position and angle of field of the ray increase compared to the conventional image pickup optical system. Therefore, the number of the pixels is insufficient, and an imaging area is reduced compared to the conventional image pickup optical system. In the present embodiment, since the lens array 102 is the reduction system, $|\sigma_1/\sigma_2|>1$ is met and the resolution of the image is deteriorated compared to the number of pixels of the image pickup element.

Next, the improvement of the spatial resolution by the pixel shift effect will be described. As illustrated in FIG. 4A, the angle of field that is viewed from each small lens of the lens array 102 is overlapped on the image-side conjugate plane 202 of the main lens unit 101 with respect to the object plane. The number of the small lenses in which the angle of field is overlapped is referred to as the overlap number of small lenses. In FIG. 4A, three small lenses project a part of an area of the image-side conjugate plane 202, and the overlap number of the small lenses is three.

FIG. 4B is a diagram that is obtained by projecting a pixel set of the image pickup element 103 corresponding to each small lens on the image-side conjugate plane 202 of the main lens unit 101. As illustrated in FIG. 4B, when each of projection pixels is shifted, they can be synthesized to reduce an apparent pixel size and to obtain a high-resolution reconstructed image.

In other words, the lens array 102 only needs to be arranged so that a pixel projected on the image-side conjugate plane 202 is shifted from each other by a length different from an integer multiple of the pitch of the projected pixels by adjacent lens cells. Thus, the high-resolution image can be obtained. In other words, pixel sets that are projected by the adjacent lens cells are referred to as a first projection pixel set and a second projection pixel set. In this case, the lens array 102 only needs to be arranged so that projection positions of pixels that constitute the first projection pixel set and the second projection pixel set do not coincide with each other. In other words, the lens array 102 only needs to be arranged so that there is no pixel that is projected on the same position of the pixels that are projected by the adjacent lens array 102.

On the contrary, when the projection pixels coincide with each other as illustrated in FIG. 4C, the pixel shift effect cannot be obtained and therefore the resolution cannot be improved. The highest resolution can be obtained by the pixel shift effect when a ratio of the pixel shift corresponds to the overlap number of the small lenses. Specifically, the overlap number is three in FIGS. 4A to 4C, and therefore the highest resolution can be obtained when the ratio of the pixel shift is 1/3 or 2/3. The details of the relationship between the ratio of the pixel shift and the overlap number of the small lenses will be described below.

Subsequently, the relationship between the distance $\sigma_1$ and the ratio of the pixel shift is obtained. A relative pixel shift amount of adjacent small lenses is represented by a ratio $|\Delta_{LA}\sigma_2/(\Delta\sigma_1)|$ that is obtained by dividing a pitch $\Delta_{LA}$ of the lens array 102 by a pitch of the pixel that is projected on the image-side conjugate plane 202 of the main lens unit 101. In the embodiment, symbol $\Delta$ denotes a pixel pitch of the image pickup element 103. In order to recognize the behavior the pixel shift amount with respect to the arrangement of the lens array, referring to FIG. 5, a condition in which $\sigma_1$ and $\sigma_2$ need to be met will be described.

Figure 5:
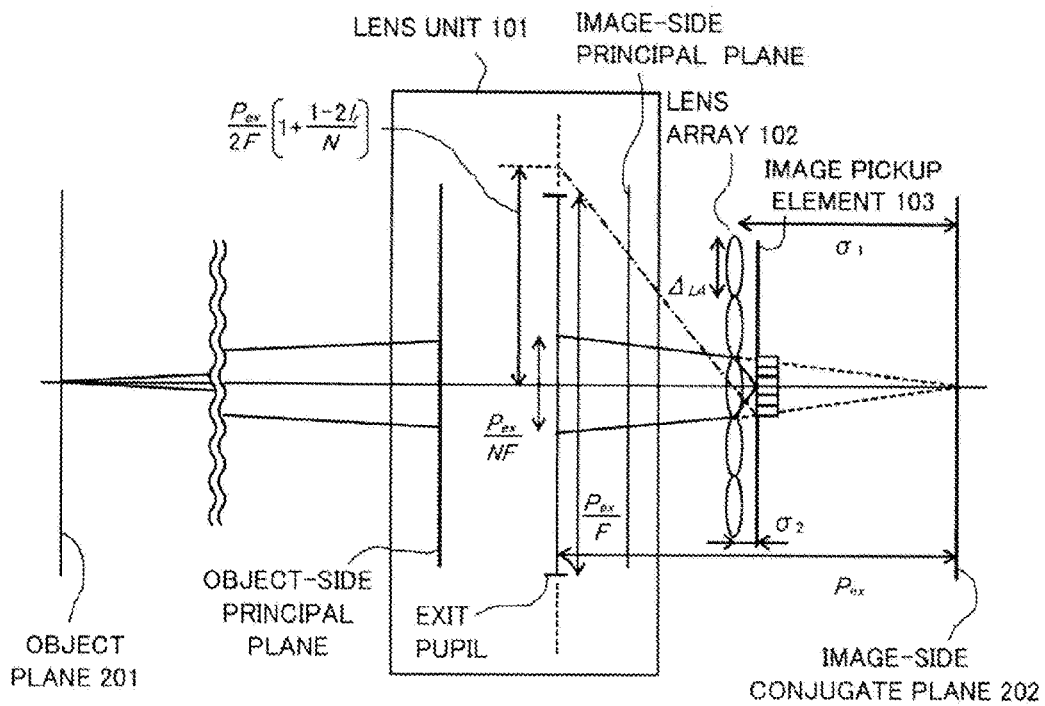
FIG. 5 is a diagram of describing an arrangement of the image pickup optical system in each of the present embodiments.

FIG. 5 illustrates a detailed configuration of FIG. 1, and a similar relationship is satisfied with respect to the configuration of FIG. 2. Symbol F in FIG. 5 denotes an F-number of the main lens unit 101, and symbol $P_{ex}$ denotes a distance between an exit pupil (a paraxial exit pupil) of the main lens unit 101 and the image-side conjugate plane 202 of the main lens unit 101. Symbol N is a positive integer, which represents the division number of a pupil plane of the main lens unit 101. Symbol $P_{ex}/(NF)$ denotes a sampling pitch of angular information that is obtained by the image pickup element 103. As can be seen in FIG. 5, the relationship between $\Delta_{LA}$ and $\sigma_1$ meets the following Expression (1).

$$\Delta_{LA} = \left|\frac{\sigma_1}{NF}\right| \tag{1}$$

In the embodiment, symbol $\sigma_1$ indicates a positive value when the object-side principal plane of the lens array 102 is disposed at a front side, i.e. object side, of the image-side conjugate plane 202, and on the other hand it indicates a negative value when the object-side principal plane is disposed at a rear side, i.e. an image side, of the image-side conjugate plane 202. A dashed-dotted line in FIG. 5 represents a straight line that connects a center of the small lens of the lens array 102 and an edge of the pixel set corresponding to the small lens, and a distance between an intersection of the straight line on the pupil plane and a pupil center is given by the following Expression (2).

$$\frac{P_{ex}}{2F}\left(1 + \frac{1-2l_r}{N}\right) \tag{2}$$

Figures 6A, 6B:
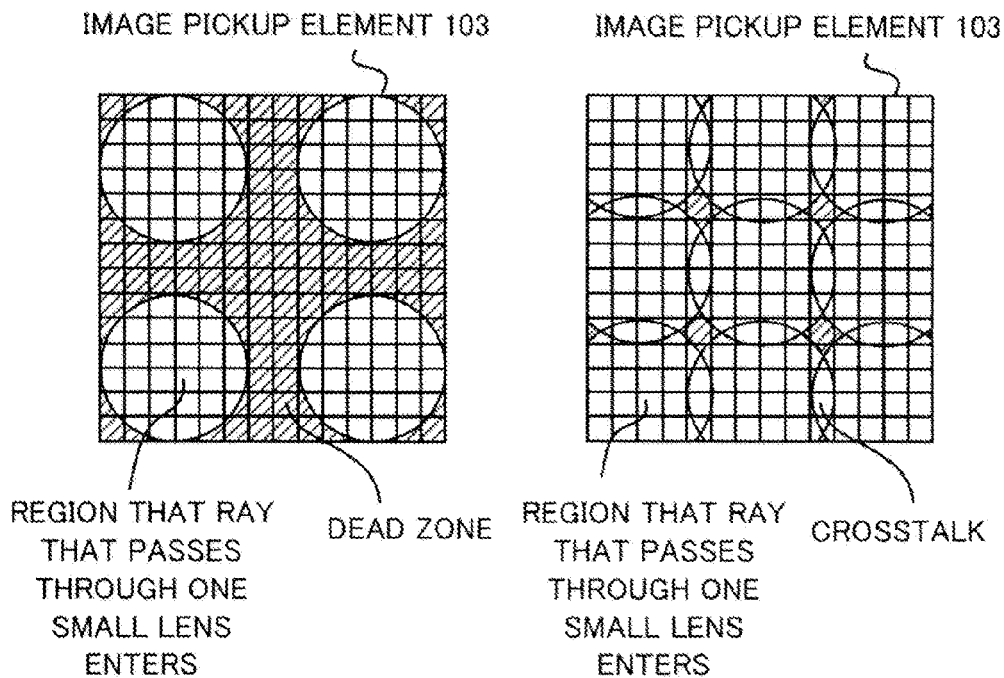
FIGS. 6A and 6B are diagrams of describing an image on an image pickup element in the present embodiment.

In the embodiment, symbol $l_r$ denotes a parameter that represents a level of a dead zone and a crosstalk on the image pickup element. Referring to FIGS. 6A and 6B, the dead zone and the crosstalk will be described.

FIG. 6A illustrates a state of an image on the image pickup element 103 when a value of $l_r$ is a negative value. White regions indicate regions which a ray enters, and a gray region is referred to as a dead zone, which is a region which the ray does not enter. As the value of $l_r$ decreases, the dead zone is expanded. Since it means that the number of pixels that do not obtain information increases, it is preferred that the dead zone be minimized. On the contrary, FIG. 6B illustrates a state of an image on the image pickup element 103 when the value of $l_r$ is a positive value. Images that are formed via different small lenses are overlapped with each other. In the overlapped region, the rays that have different positions and angles on the object plane 201 enter the same pixel, and this phenomenon is referred to as a crosstalk. As the value of $l_r$ increases, the region of the crosstalk is expanded. Since the pixel in which the crosstalk is generated cannot obtain the light field, an exact image cannot be generated if the pixel is used for the reconstruction.

When the pixel in which the crosstalk is generated is not used for the reconstruction of the image, pixels that cannot be used increase as the region of the crosstalk is large. Therefore, it is preferred that the region where the crosstalk is generated be minimized. When the value of $l_r$ is zero, the generations of the dead zone and the crosstalk are minimized. In a real system, however, due to the influence of a shift of the best focus position caused by aberrations, vignetting of the main lens unit 101, light falloff at edges, or the like, the generation of the dead zone or the crosstalk may be suppressed even when the value of $l_r$ is slightly shifted from zero.

Based on FIG. 5 and Expression (2), the following Expression (3) is met.

$$\frac{N+1-2l_r}{N}\frac{P_{ex}\sigma_2}{2F(P_{ex}-\sigma_1)} = \frac{\Delta_{LA}}{2} \tag{3}$$

Therefore, using Expressions (1) and (3), the relative pixel shift amount of the adjacent small lenses is given by the following Expression (4).

$$\frac{\Delta_{LA}}{\Delta|\sigma_1/\sigma_2|} = \frac{1}{N(N+1-2l_r)F}\left|\frac{\sigma_1}{\Delta}\right|\left(1 - \frac{\sigma_1}{P_{ex}}\right) \tag{4}$$

Expression (4) is an expression that represents a behavior of the relative pixel shift amount of the adjacent small lenses with respect to the distance $\sigma_1$.

Figure 7:
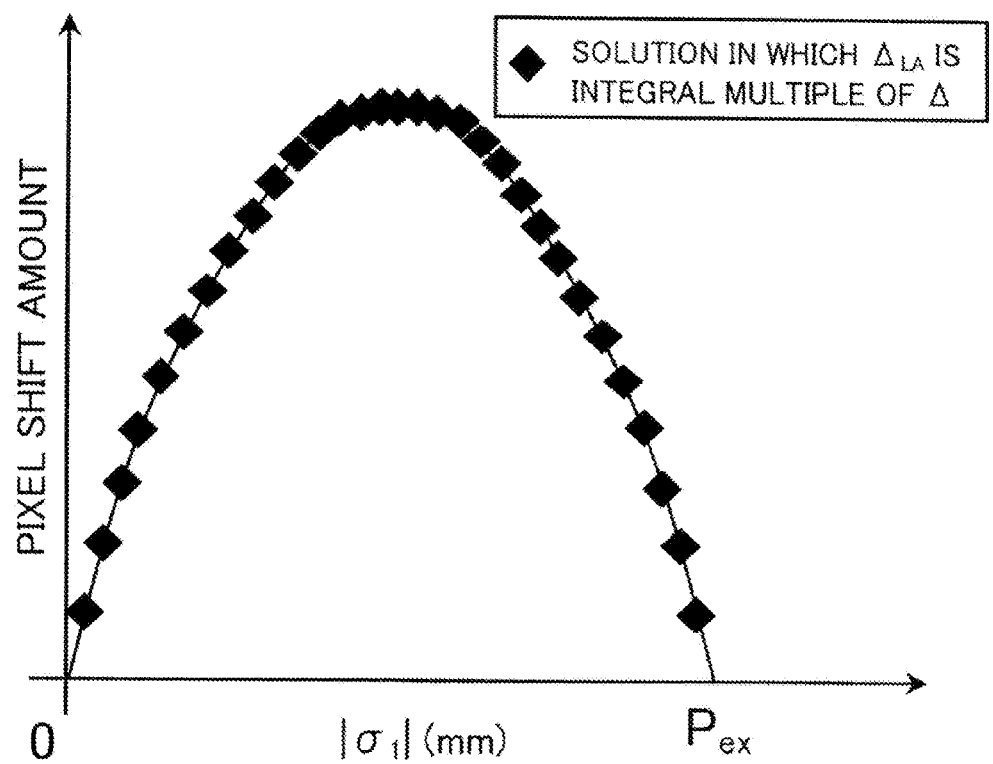
FIG. 7 is a diagram of indicating a pixel shift amount with respect to a distance $\sigma_1$.

Next, a sensitivity of the distance $\sigma_1$ with respect to the pixel shift effect will be described. The following is a description of an example of the configuration illustrated in FIG. 1, but the same is true for the configuration illustrated in FIG. 2. Referring to Expression (4), the pixel shift amount with respect to the distance $\sigma_1$ is represented as FIG. 7. Lozenge-shaped points in FIG. 7 represent solutions in which the number of pixels of the pixel set corresponding to the small lens is an integer. In the distance $\sigma_1$ other than these solutions, the crosstalk described above is generated. However, if a wall surface is provided on the image pickup element 103 so that the ray from a different small lens does not enter the pixel set corresponding to a certain small lens, the crosstalk can be suppressed even when the number of the pixel sets corresponding to the small lens is not the integer. Since the shift of the integer multiple of the pixels is meaningless as illustrated in FIG. 4C, an integer portion in Expression (4) may be ignored. Therefore, a ratio $\delta$ of the pixel shift is represented as the following Expression (5).

$$\delta = \mathrm{mod}\left(\left|\frac{\Delta_{LA}\sigma_2}{\Delta\sigma_1}\right|, 1\right) \quad (5)$$

In Expression (5), z=mod(x,y) means that a value of z is equal to a residue of a result obtained by dividing x by y.

Figure 8:
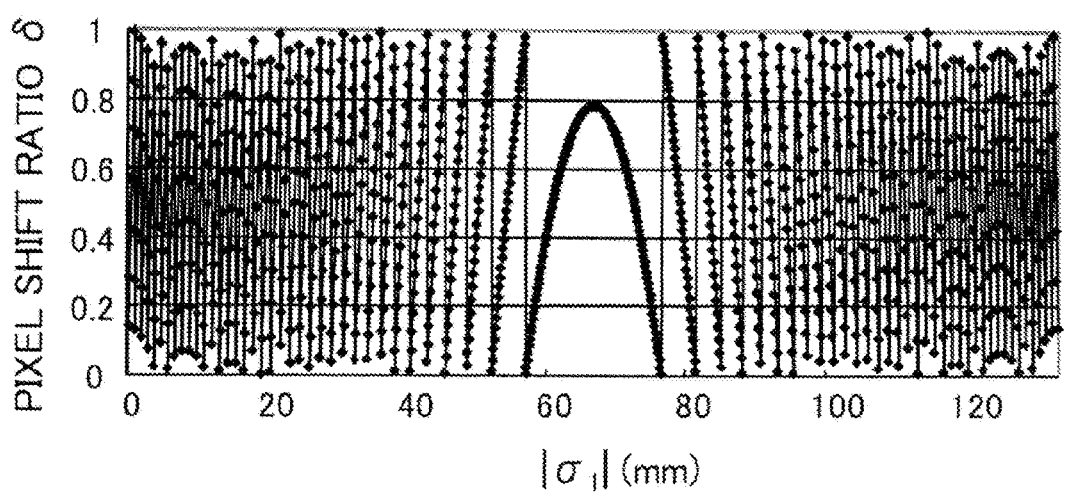
FIG. 8 is a diagram indicating a ratio of pixel shift with respect to distance $\sigma_1$.

FIG. 8 is a diagram of illustrating the ratio $\delta$ of the pixel shift with respect to the distance $\sigma_1$ that is obtained by Expression (5) when a predetermined parameter is used. The parameter that is used in FIG. 8 is a parameter in Embodiment 3 described below. Ideally, it is preferred that the lens array 102 be disposed at a position of the distance $\sigma_1$ where the ratio of the pixel shift that indicates the highest resolution is obtained. In a real system, however, an error is contained in the arrangement of the lens array 102, and the pixel shift effect is reduced by the error. Therefore, it is preferred that the lens array 102 be disposed at a position of the distance $\sigma_1$ where the pixel shift effect does not easily change even when the error is generated. Referring to Expression (4) and FIG. 7, the ratio of the pixel shift can be represented by a quadratic function with respect to the distance $\sigma_1$. Therefore, the deterioration of the pixel shift effect caused by the error of the distance $\sigma_1$ can be suppressed by preventing a portion of both ends of the graph in FIG. 7 where the inclination is steep. Thus, a condition that the sensitivity of the distance $\sigma_1$ is suppressed and that the high resolution is easily obtained can be introduced.

In the present embodiment, the position where the lens array 102 is disposed meets the following Conditional Expression (6).

$$0.05 < \left|\frac{\sigma_1}{P_{ex}}\right| < 0.95 \quad (6)$$

In the image pickup apparatus that has the configuration illustrated in FIGS. 1 and 2, the high-resolution image can be obtained by meeting Conditional Expression (6). If the value of $|\sigma_1/P_{ex}|$ is greater than the upper limit or smaller than the lower limit of Conditional Expression (6), the deterioration of the resolution caused by the error of the distance $\sigma_1$ easily occurs.

It is preferred that the range of the following Conditional Expression (6a) be met to suppress the sensitivity of the distance $\sigma_1$ to easily achieve the high resolution.

$$0.18 < \left|\frac{\sigma_1}{P_{ex}}\right| < 0.82 \quad (6a)$$

It is more preferred that the range of the following Conditional Expression (6b) or (6c) be met to further suppress the sensitivity of the distance $\sigma_1$ to easily achieve the high resolution.

$$0.30 < \left|\frac{\sigma_1}{P_{ex}}\right| < 0.70 \quad (6b)$$

$$0.40 < \left|\frac{\sigma_1}{P_{ex}}\right| < 0.60 \quad (6c)$$

However, when the values of Conditional Expressions (6) and (6a) to (6c) come close to 1, the resolution of the image obtained by the image pickup element 103 is reduced since a magnification $|\sigma_2/\sigma_1|$ of the lens array decreases. Ideally, when the n small lenses that have a pixel shift of 1/n are overlapped, the resolution is magnified n times. In the embodiment, n is a positive integer. In the real system, however, an improvement amount of the resolution by the pixel shift effect is smaller than that of the ideal system due to the influences of a noise or aberrations of the main lens unit 101. Therefore, it is preferred that the resolution of the image obtained by the image pickup element 103 be ensured to some extent. In the configuration illustrated in FIG. 1, when the value of Conditional Expression (6) comes close to 1, there is a case where the lens array interferes with the main lens unit 101. Accordingly, it is more preferred that the upper limits of Conditional Expressions (6) and (6a) to (6c) be set to be smaller than 0.1 to suppress the sensitivity to obtain a further high-resolution light field.

Next, a condition that can obtain the pixel shift effect will be considered. As described above, when the relative pixel shift amount of the adjacent small lenses that is represented by Expression (4) is an integer, the pixel shift effect cannot be obtained as illustrated in FIG. 4C. Therefore, the lens array 102 may be disposed so that a shift of the projection pixel of two small lenses adjacent to each other is not an integral multiple of the projection pixel when the pixel of the image pickup element 103 is projected on the image-side conjugate plane 202.

Figure 9:
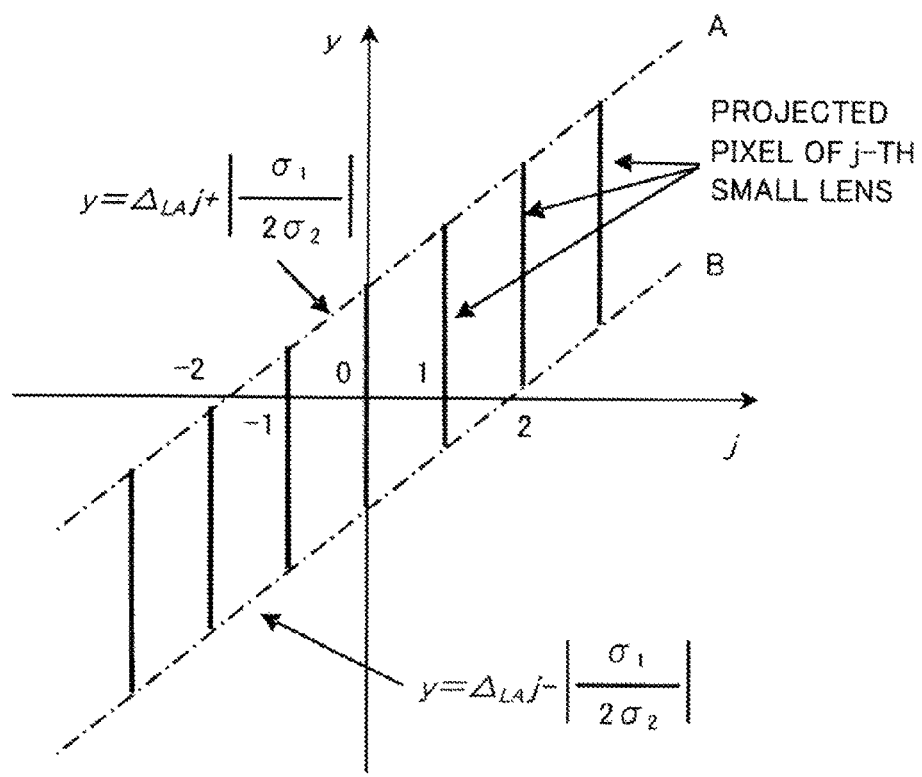
FIG. 9 is a diagram describing the overlap number of small lenses in each of the present embodiments.

Subsequently, a condition that obtains a higher pixel shift effect is obtained. First of all, the overlap number of the small lenses is estimated. FIG. 9 is a graph that has a horizontal axis indicating the number j of the small lens illustrated in FIG. 4B and that has a vertical axis indicating a coordinate y on the image-side conjugate plane 202 of the main lens unit 101 with respect to the object plane 201. In the embodiment, j=0 may be an arbitrary small lens of the lens array 102. Each of straight lines parallel to a y-axis in FIG. 9 represents a coordinate that is obtained when the pixel set corresponding to the j-th small lens is projected on the image-side conjugate plane 202. A dashed-dotted line A connects points indicating the upper limits of these straight lines, and a dashed-dotted line B connects points indicating the lower limits of these straight lines. The dashed-dotted line A is given by $y=\Delta_{LA}\{j+|\sigma_1/(2\sigma_2)|\}$, and the dashed-dotted line B is given by $y=\Delta_{LA}\{j-|\sigma_1/(2\sigma_2)|\}$. The number of the overlapped small lenses corresponds to a gap between the dashed-dotted lines A and B in a j direction, and the number can be estimated at around $|c_1/\sigma_2|+1$ when the small lens of j=0 is also counted.

Subsequently, the spatial resolution including the pixel shift effect is obtained. As described above, in the real system, the improvement amount of the resolution by the pixel shift effect is smaller than that of the ideal system. However, for easy description, the improvement of the resolution in the ideal system will be described in the present embodiment. A final resolution is defined to be determined by the largest pixel of the pixels that become apparently small by the pixel shift effect. The pixel size is referred to as the maximum value of the apparent pixels.

For example, when the overlap number of the small lenses is eight and the ratio δ of the pixel shift of the adjacent small lenses that is represented by Expression (5) is 0.45, the pixel shifts of the eight small lenses are 0, 0.45, 0.90, 0.35, 0.80, 0.25, 0.70, and 0.15, respectively. In this case, the maximum value of the apparent pixels that determines the resolution is 0.70−0.45=0.25. Next, a case in which the overlap number is the same and the ratio δ is 3/8 is considered. In this case, the pixel shifts of the eight small lenses are 0, 3/8, 6/8, 1/8, 4/8, 7/8, 2/8, and 5/8, respectively. In this case, the maximum value of the apparent pixels is 1/8, which is identical to the inverse of the overlap number. Therefore, when the ratio of the shift of the pixel where the adjacent small lens projects is identical to the inverse of the overlap number of the small lenses, the largest pixel shift effect is obtained. The same is true for a case where the ratio δ represented by Expression (5) is 1/8, 5/8, or 7/8. However, when the ratio δ is 2/8, 4/8, or 6/8, the pixel shift effect is deteriorated. For example, the case where the ratio δ is 2/8 is considered. In this case, the pixel shifts of the eight overlapped small lenses are 0, 2/8, 4/8, 6/8, 0, 2/8, 4/8, and 6/8, respectively, and the maximum value of the apparent pixels is 2/8=1/4 since the pixels are overlapped with each other. Therefore, the pixel shift effect is half compared to the case where the ratio δ is 1/8, 3/8, 5/8, or 7/8.

Accordingly, when the ratio δ given by Expression (5) is equal to $m_0/M_0$, the largest pixel shift effect can be obtained. In the embodiment, symbol $M_0$ denotes the overlap number of the small lenses, and symbol $m_0$ denotes an integer that is smaller than $M_0$, where the greatest common factor of $m_0$ and $M_0$ is 1. As described above, the overlap number $M_0$ can be estimated at around $|\sigma_1/\sigma_2|+1$, and the pixel shift effect is improved as the ratio δ comes close to $m_0/M_0$.

Figure 10:
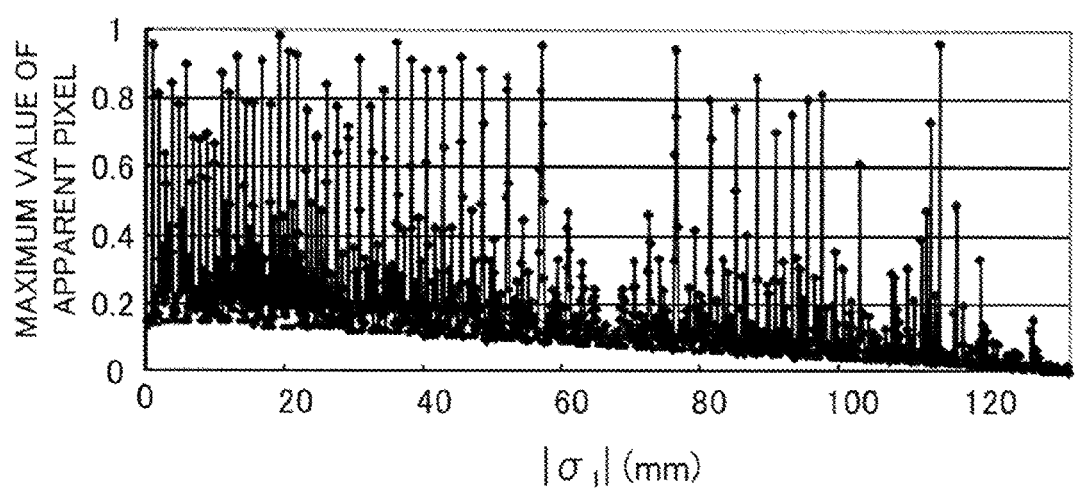
FIG. 10 is a diagram of describing a spatial resolution including the pixel shift effect in each of the present embodiments.
Figure 11:
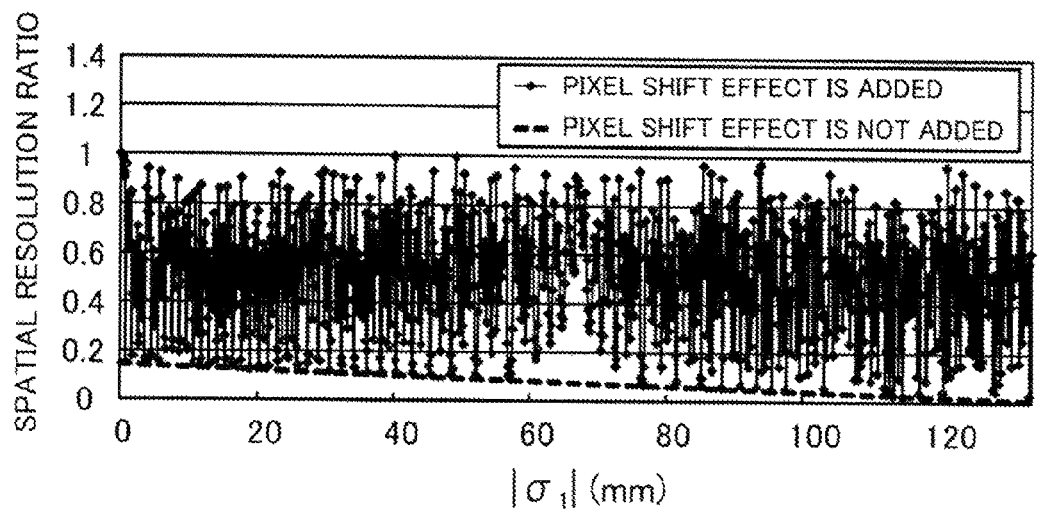
FIG. 11 is a diagram of indicating a relationship between distance $\sigma_1$ and spatial resolution ratio.

FIG. 10 is a diagram of illustrating a relationship between the maximum value of the apparent pixels with respect to the distance $\sigma_1$ and the inverse of the overlap number of the small lenses using the same parameter as that of FIG. 8. As the maximum value of the apparent pixels represented by a lozenge-shaped point and the inverse of the overlap number of the small lenses represented by a dashed line are close to each other with respect to the distance $\sigma_1$, the pixel shift effect is heightened and the resolution of the reconstructed image is improved. On the contrary, in the distance $\sigma_1$ where the maximum value of the apparent pixels and the inverse of the overlap number of the small lenses are distant from each other, a large pixel shift effect cannot be obtained. FIG. 11 is a relationship between the distance $\sigma_1$ and the spatial resolution ratio when the same parameter as that of FIG. 8 is used. The spatial resolution ratio of the vertical axis is indicated by normalizing the spatial resolution of the reconstructed image by the number of the pixels of the image pickup element. As the lozenge-shaped point and the inverse of the overlap number of the small lenses are close to each other with respect to the distance $\sigma_1$ in FIG. 10, the resolution including the pixel shift effect is improved. On the contrary, in the distance $\sigma_1$ where the maximum value of the apparent pixels is closer to 1 in FIG. 10, the improvement of the resolution by the pixel shift effect is scarcely shown. As described above, as the distance $|\sigma_1|$ comes close to $P_{ex}/2$, the fluctuation of the spatial resolution ratio is gentle and the sensitivity of the lens array is suppressed.

Thus, Conditional Expression (7) that is used for efficiently obtaining the improvement of the resolution by the pixel shift effect can be obtained.

$$0.9 < \frac{M}{m} \text{mod}\left(\left|\frac{\Delta_{LA}\sigma_2}{\Delta\sigma_1}\right|, 1\right) < 1.1 \quad (7)$$

In Conditional Expression (7), symbol M denotes an integer that meets the following Conditional Expression (8).

$$0.2 < \frac{M}{1+|\sigma_1/\sigma_2|} < 2.0 \quad (8)$$

Symbol m denotes an integer that is smaller than the integer M, and the greatest common factor of m and M is 1. Conditional Expressions (7) and (8) represent the level of the pixel shift effect, and the high-resolution of the reconstructed image can be achieved by meeting Conditional Expressions (7) and (8). If the values of $(M/m)\text{mod}(|\Delta_{LA}\sigma_2/\Delta\sigma_1|,1)$ and $M/(1+|\sigma_1/\sigma_2|)$ are greater than the upper limit or smaller than the lower limit of Conditional Expressions (7) and (8) respectively, a sufficient pixel shift effect cannot be obtained and therefore the improvement of the spatial resolution is insufficient.

It is preferred that the following Conditional Expression (7a) be met in order to obtain a higher resolution image.

$$0.93 < \frac{M}{m} \text{mod}\left(\left|\frac{\Delta_{LA}\sigma_2}{\Delta\sigma_1}\right|, 1\right) < 1.07 \quad (7a)$$

It is more preferred that the following Conditional Expression (7b) be met in order to obtain a further high-resolution image.

$$0.95 < \frac{M}{m} \text{mod}\left(\left|\frac{\Delta_{LA}\sigma_2}{\Delta\sigma_1}\right|, 1\right) < 1.05 \quad (7b)$$

More preferably, the following Conditional Expression (8a) or 8(b) is met in order to obtain a larger pixel shift effect.

$$0.4 < \frac{M}{1+|\sigma_1/\sigma_2|} < 1.6 \quad (8a)$$

$$0.6 < \frac{M}{1+|\sigma_1/\sigma_2|} < 1.4 \quad (8b)$$

It is preferred that the image-side surface of the small lens that constitutes the lens array 102 have a convex shape. Thus, the astigmatism of the lens array 102 is suppressed and the sensitivity with respect to the resolution can be decreased. On the contrary, when the image-side surface does not have the convex shape, the astigmatism is large, and the periphery of the image formed by each small lens is blurred. If the blurred portion is used for the reconstruction processing, the reconstructed image is not formed sharply. It is more preferred that the object-side surface of the small lens that constitutes the lens array 102 have a plane or convex shape. Thus, the curvature of the small lens moderates and the aberrations are suppressed, and therefore the sensitivity can be further decreased.

It is preferred that the lens array 102 be disposed at the object side relative to the image-side conjugate plane 202 of the main lens unit 101 with respect to the object plane 201. As can be seen from the comparison of FIGS. 1 and 2, it is because the configuration of FIG. 1 can reduce the total length of the image pickup optical system compared to the configuration of FIG. 2. Furthermore, in the configuration of FIG. 1, an image height where an off-axis ray enters the lens array 102 and the image pickup element 103 is smaller than that in the configuration of FIG. 2. As described above, the size of the image pickup optical system can be reduced by adopting the arrangement as illustrated in FIG. 1.

Other effects of the present embodiment are that an image in which the resolution is optically improved can be obtained by meeting a condition that has an appropriate relationship between the lens array and the image pickup element.

In the image pickup optical systems illustrated in FIGS. 1 and 2, an image in which small images having different imaging viewpoints and imaging regions are arrayed is obtained by the image pickup element. An image having different focus positions, F-numbers, or viewpoints can be obtained by a method of weighting all or a part of these images or a method of overlapping these images while shifting them (a reconstruction method). For example, this method is disclosed in "Light Field Photography with a Hand-held Plenoptic Camera" (Ren Ng, et al., Stanford Tech Report CTSR 2005-02). Therefore, the description of the method is omitted in the embodiment. The configuration of the present embodiment is slightly different from the above literature, but there is essentially no difference between them since the configuration of dividing the pupil of the main lens unit is the same. Therefore, an image in which the focus position, depth of field, or imaging viewpoint is changed can be generated by using the similar reconstruction method. Also in this case, the high-resolution reconstructed image can be obtained by using the pixel shift effect. The reconstruction processing may also be performed by an image processing apparatus that is separated from the image pickup apparatus.

A person or an object does not have to exist on the object plane 201 that is illustrated in FIGS. 1 and 2. This is because the focusing on the person or the object that exists in back of or in front of the object plane 201 can be performed by the reconstruction processing after taking an image. The main lens unit 101 may also consist of one lens.

Embodiment 1

Figure 12:
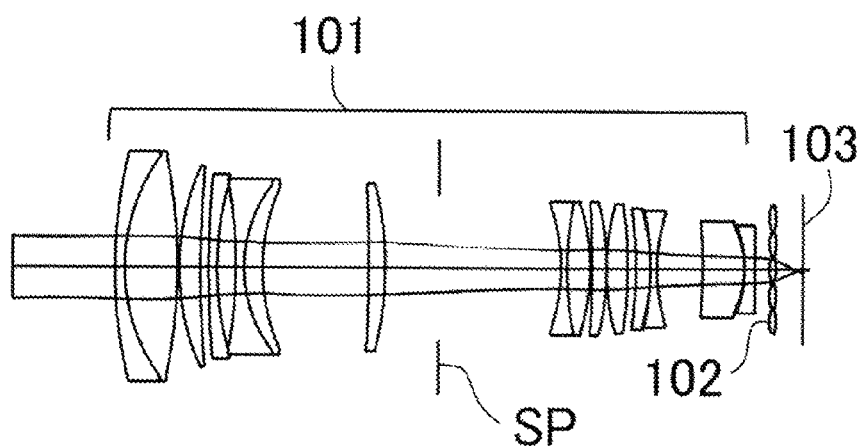
FIG. 12 is a cross-sectional diagram of the image pickup optical system in Embodiment 1.

Next, referring to FIG. 12, an image pickup apparatus (an image pickup optical system) in Embodiment 1 will be described. FIG. 12 is a cross-sectional diagram of the image pickup optical system in the present embodiment. In FIG. 12, the main lens unit 101 is a single focus lens, which includes an aperture stop SP that controls the F-number at the time of taking an image. However, in order to obtain many parallax information, it is preferred that the aperture diameter be large. In the present embodiment, the aperture diameter may also be fixed since the F-number can be changed by the reconstruction after taking the image.

The main lens unit 101 is provided with a focus mechanism in accordance with specifications. When the main lens unit 101 includes the focus mechanism, a lens position is controlled by an autofocus (AF) mechanism or a manual focus mechanism (not shown). In the present embodiment, a focusing after taking an image (refocusing) can be performed by the image processing, but the parallax information that is obtained by the image pickup element 103 is limited since the aperture diameter is limited. Therefore, a range in which the refocusing can be performed is also limited. The refocusing range can be shifted in a depth direction by changing the focus position at the time of taking the image.

The lens array 102 has a positive refractive power and is configured by a spherical solid lens whose both surfaces have a convex shape. One of the two sides of the small lens of the lens array 102 may also have a plane or have an aspherical curved surface. It may also be configured by arraying liquid lenses, liquid crystal lenses, diffractive optical elements, or the like. The lens array 102 forms an image on the image pickup element 103 by viewing the image formed by the main lens unit 101 as a virtual object.

In the present embodiment, the distance $P_{ex}$ from the exit pupil of the main lens unit 101 to the image-side conjugate plane 202 of the main lens unit 101 is equal to 66.4357 (mm), the pitch $\Delta_{LA}$ of the lens array 102 is equal to 4.3559 (mm), and the pixel pitch $\Delta$ of the image pickup element 103 is equal to 0.0043 (mm). The lens array 102 is disposed so that the distance $\sigma_1$ is equal to 37.7657 (mm) and the distance $\sigma_2$ is equal to 5.4325 (mm). In such a configuration, the large pixel shift effect is obtained and therefore the high-resolution image can be obtained. In addition, the arrangement sensitivity of the lens array 102 with respect to the pixel shift effect can also be suppressed. The high-resolution using the pixel shift effect is also achieved for the reconstructed image in which the F-number, the focus position, or the depth of field is changed. A further high-resolution image may be obtained along with image estimation such as MAP (Maximum a posteriori) estimation at the time of reconstructing the image.

Embodiment 2

Figure 13:
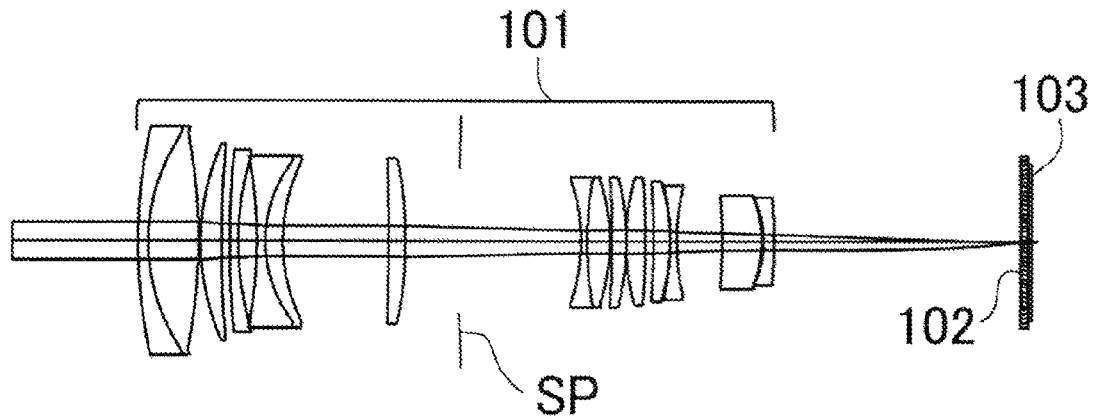
FIG. 13 is a cross-sectional diagram of the image pickup optical system in Embodiment 2.

Next, referring to FIG. 13, an image pickup apparatus (an image pickup optical system) in Embodiment 2 will be described. FIG. 13 is a cross-sectional diagram of the image pickup optical system in the present embodiment. In FIG. 13, the main lens unit 101 is a single focus lens. The lens array 102 is configured by a surface having a plane at the object side and a surface having a convex shape at the image side, which reforms an image formed by the main lens unit 101 on the image pickup element 103.

In the present embodiment, the distance $P_{ex}$ from the exit pupil of the main lens unit 101 to the image-side conjugate plane 202 of the main lens unit 101 is equal to 66.4357 (mm), the pitch $\Delta_{LA}$ of the lens array 102 is equal to 0.3784 (mm), and the pixel pitch $\Delta$ of the image pickup element 103 is equal to 0.0043 (mm). The lens array 102 is disposed so that the distance $\sigma_1$ is equal to −5.4679 (mm) and the distance $\sigma_2$ is equal to 1.0036 (mm). Since the conjugate plane of the lens array 102 with respect to the image pickup element 103, i.e. the image-side conjugate plane 202 of the main lens unit 101 with respect to the object plane 201, exists at the object side relative to the lens array 102, the distance $\sigma_1$ is a negative value.

According to the present embodiment, an image pickup apparatus that suppresses the arrangement sensitivity of the lens array and that achieves efficient high-resolution using the pixel shift effect can be provided.

Embodiment 3

Figure 14:
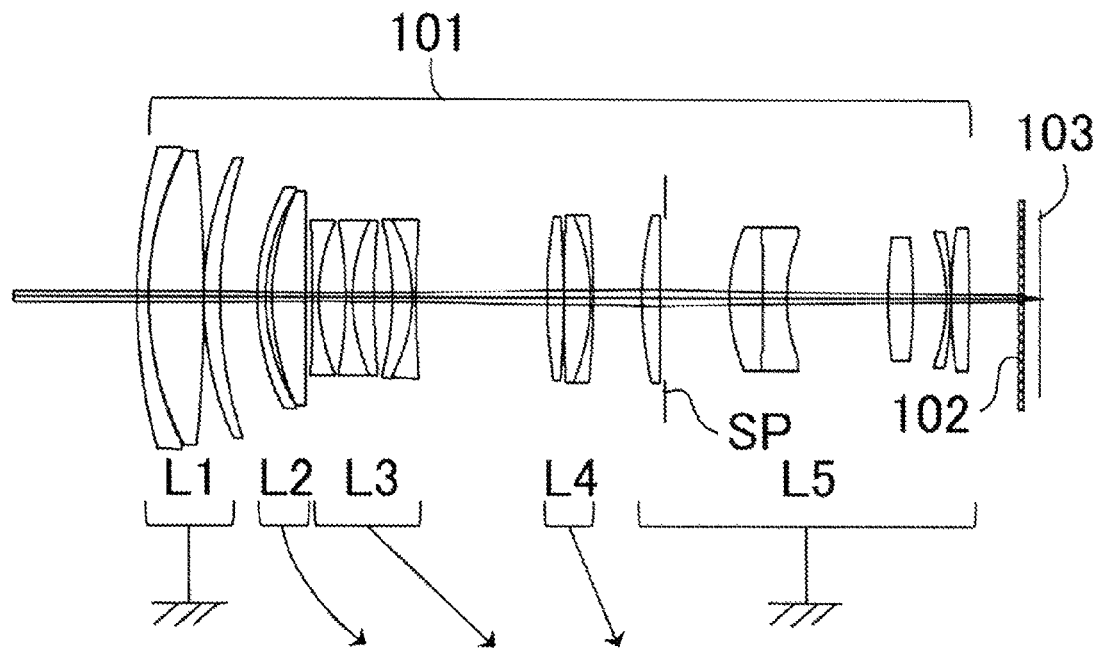
FIG. 14 is a cross-sectional diagram of the image pickup optical system in Embodiments 3 and 4.

Next, referring to FIG. 14, an image pickup apparatus (an image pickup optical system) in Embodiment 3 will be described. FIG. 14 is a cross-sectional diagram of the image pickup optical system in the present embodiment. In FIG. 14, the main lens unit 101 is a zoom lens, and the lens array 102 is configured by a biconvex positive lens, which forms an image on the image pickup element 103 by viewing the image formed by the main lens unit 101 as a virtual object.

The main lens unit 101 is configured by a first lens unit L1 having a positive refractive power, a second lens unit L2 having a positive refractive power, a third lens unit L3 having a negative refractive power, a fourth lens unit L4 having a positive refractive power, and a fifth lens unit L5 having a positive refractive power, in order from the object side. When the magnification is varied, the first lens unit L1 and the fifth lens unit L5 are fixed and the second lens unit L2, the third lens unit L3, and the fourth lens unit L4 move on an optical axis.

In the present embodiment, at a wide-angle end of the main lens unit 101, the distance $P_{ex}$ from the exit pupil of the main lens unit 101 to the image-side conjugate plane 202 of the main lens unit 101 is equal to 133.8129 (mm), the pitch $\Delta_{LA}$ of the lens array 102 is equal to 1.9776 (mm), and the pixel pitch $\Delta$ of the image pickup element 103 is equal to 0.0064 (mm). FIGS. 7 and 9 described above illustrate the ratio 5 of the pixel shift and the resolution including the pixel shift effect using these parameters and N=7 and $l_r$=0.5. Since an aperture stop (not shown) is installed at the small lens of the lens array 102, the crosstalk does not occur even when $l_r$ is equal to 0.5. The lens array 102 is disposed so that the distance $\sigma_1$ is equal to 40.1453 (mm) and the distance $\sigma_2$ is equal to 4.0145 (mm).

According to the present embodiment, an image pickup apparatus that suppresses the arrangement sensitivity of the lens array and that achieves efficient high-resolution using the pixel shift effect can be provided.

Embodiment 4

Figure 15:
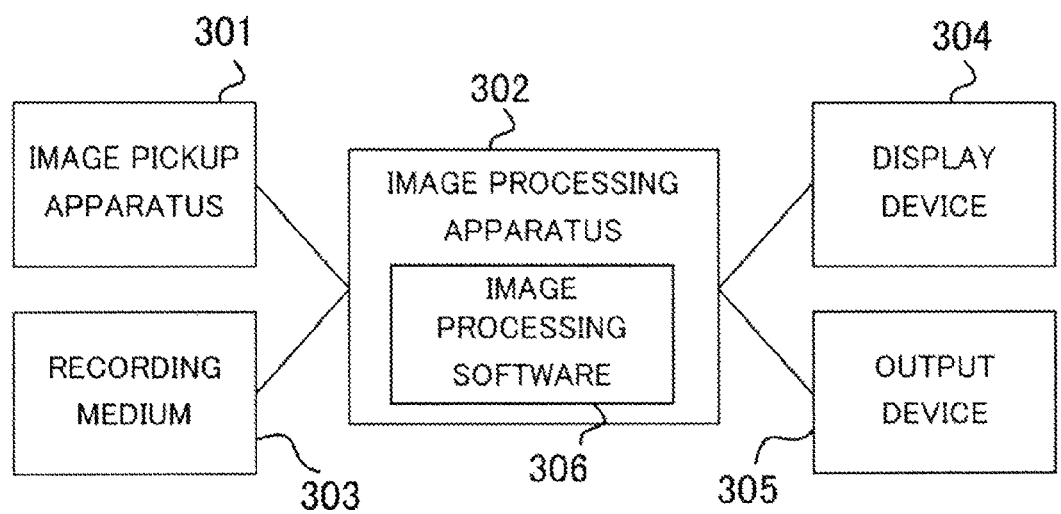
FIG. 15 is a configuration diagram of the image processing system in Embodiment 4.

Next, referring to FIG. 15, an image pickup apparatus in Embodiment 4 will be described. FIG. 15 is a configuration diagram of an image processing system in the present embodiment. As illustrated in FIG. 15, the image processing system includes an image pickup apparatus 301. The image pickup apparatus 301 includes the image pickup optical system of Embodiment 3 that is illustrated in FIG. 14. An image processing apparatus 302 is a computer device that performs the image reconstruction described above. A predetermined reconstruction processing is performed for an image obtained by the image pickup apparatus 301 using the image processing apparatus 302, and then the image is outputted to one or a plurality of an output device 305, a display device 304, and a storage medium 303. The storage medium 303 is, for example a semiconductor memory, a hard disk, or a server on a network. The output device 305 is for example a printer. The display device 304 is connected to the image processing apparatus 302, and the reconstructed image is inputted to the display device 304. A user can work while confirming the reconstructed image via the display device 304.

Image processing software 306 has a function that performs a development processing and other image processings if needed, as well as the reconstruction processing described above. The display device 304 is for example a liquid crystal display or a projector. In particular, when the display device 304 is a DLP (Digital Light Processor) type projector that uses a DMD (Digital Micro-mirror Device), an optical system in the projector may also be configured similarly to FIG. 14. In this case, the optical system in the projector can adopt the configuration where the DMD is installed instead of the image pickup element 103 of FIG. 14. In this case, instead of inputting the reconstructed image to the display device 304, the image obtained by the image pickup element 103 of the image pickup apparatus 301 can be inputted as it is. Since the conversion at the time of image projection is performed inversely with a case of taking an image, an image that is automatically reconstructed is outputted onto a screen. In addition, since the pixel shift effect is generated on a conjugate plane of the DMD with respect to the lens array 102, a high-resolution output image can be similarly obtained. According to the present embodiment, an image pickup apparatus and an image processing system that suppress the arrangement sensitivity of the lens array and that achieve the efficient high-resolution can be provided.

While the present invention has been described with reference to embodiments, it is to be understood that the invention is not limited to the disclosed embodiments. The scope of the following claims is to be accorded the broadest interpretation so as to encompass all such modifications and equivalent structures and functions. For example, even when the present invention is applied to an image pickup optical system that is removable from an image pickup apparatus having an image pickup element, the image pickup optical system capable of obtaining the high-resolution light field with a simple configuration can be provided by using the image pickup optical system and the image pickup element that meet the relationship described above.

Numerical data (numerical example) of the main lens unit in each of the embodiments described above (Embodiments 1 to 4) will be described as follows. Symbol i denotes an order of a surface from the object side, symbol $r_i$ denotes a radius of curvature of an i-th surface, symbol $d_i$ denotes a lens thickness or an air gap between the i-th surface and the (i+1)th surface, and symbols $n_i$ and $v_i$ denote a refractive index and Abbe number for d-line, respectively. In Table 1, values of Conditional Expressions (6), (7), and (8) in each of the numerical examples (Embodiments 1 to 4) will be indicated.

NUMERICAL EXAMPLES (EMBODIMENTS 1 and 2)
Unit [mm]

Surface data

| Surface Number | r | d | nd | vd | Effective diameter |
|---|---|---|---|---|---|
| 1 | 89.763 | 1.80 | 1.84666 | 23.8 | 40.57 |
| 2 | 35.283 | 9.50 | 1.58913 | 61.2 | 38.63 |
| 3 | −104.031 | 0.15 | | | 38.18 |
| 4 | 45.845 | 3.80 | 1.77250 | 49.6 | 34.85 |
| 5 | 205.586 | 1.60 | | | 34.09 |
| 6 | 190.384 | 1.50 | 1.80010 | 35.0 | 32.16 |
| 7 | 57.059 | 3.26 | | | 30.16 |
| 8 | −88.455 | 1.50 | 1.56873 | 63.2 | 30.22 |
| 9 | 23.683 | 3.50 | 1.84666 | 23.8 | 28.33 |
| 10 | 37.253 | 19.26 | | | 27.84 |
| 11 | −380.953 | 3.00 | 1.84666 | 23.8 | 28.98 |
| 12 | −70.178 | 10.00 | | | 29.11 |
| 13 | ∞ | 22.12 | | | 26.48 |
| 14 | −37.638 | 1.20 | 1.78472 | 25.7 | 21.81 |
| 15 | 57.202 | 4.30 | 1.52249 | 59.8 | 22.35 |
| 16 | −38.872 | 0.30 | | | 22.71 |
| 17 | −249.784 | 2.50 | 1.77250 | 49.6 | 22.78 |
| 18 | −59.162 | 0.20 | | | 22.89 |
| 19 | 56.254 | 3.50 | 1.80400 | 46.6 | 22.42 |
| 20 | −100.510 | 1.50 | | | 21.91 |
| 21 | −109.205 | 2.80 | 1.84666 | 23.8 | 20.71 |
| 22 | −44.064 | 0.16 | | | 20.09 |
| 23 | −42.571 | 1.20 | 1.60311 | 60.6 | 19.94 |

(EMBODIMENTS 1 and 2)
Unit [mm]

| | | | | | |
|---|---|---|---|---|---|
| 24 | 41.456 | 8.27 | | | 18.54 |
| 25 | −84.040 | 7.29 | 1.62230 | 53.2 | 15.96 |
| 26 | −19.904 | 0.15 | | | 15.00 |
| 27 | −19.678 | 2.00 | 1.59270 | 35.3 | 14.85 |
| 28 | −118.544 | 0.00 | | | 14.29 |
| 29 | ∞ | (variable) | | | 14.22 |
| Image plane | ∞ | | | | |

Various kinds of data
Zoom ratio 1.00

| | |
|---|---|
| Focal length | 99.96 |
| F-number | 2.89 |
| Angle of field | 8.31 |
| Image height | 14.60 |
| Total lens length | 156.82 |
| BF | 40.46 |
| d29 | 40.46 |
| Entrance pupil position | 117.08 |
| Exit pupil position | −25.97 |
| Front side principal point position | 66.63 |
| Rear side principal point position | −59.50 |

Zoom lens unit data

| Unit | Start surface | Focal length | Lens configuration length | Front side principal position | Rear side principal position |
|---|---|---|---|---|---|
| 1 | 1 | 99.96 | 116.36 | 66.63 | −59.50 |

Single lens data

| Lens | Start surface | Focal length |
|---|---|---|
| 1 | 1 | −69.72 |
| 2 | 2 | 45.88 |
| 3 | 4 | 75.59 |
| 4 | 6 | −102.35 |
| 5 | 8 | −32.69 |
| 6 | 9 | 68.67 |
| 7 | 11 | 101.16 |
| 8 | 14 | −28.77 |
| 9 | 15 | 44.99 |
| 10 | 17 | 99.78 |
| 11 | 19 | 45.31 |
| 12 | 21 | 85.56 |
| 13 | 23 | −34.64 |
| 14 | 25 | 40.16 |
| 15 | 27 | −40.11 |

(EMBODIMENTS 3 and 4)
Unit [mm]

Surface data

| Surface number | r | d | nd | vd | Effective diameter |
|---|---|---|---|---|---|
| 1 | 124.447 | 2.80 | 1.74950 | 35.0 | 69.47 |
| 2 | 75.819 | 0.15 | | | 66.70 |
| 3 | 75.787 | 12.51 | 1.49700 | 81.6 | 66.68 |
| 4 | −374.867 | 0.10 | | | 65.27 |
| 5 | 78.754 | 3.65 | 1.49700 | 81.6 | 62.96 |
| 6 | 102.655 | (variable) | | | 62.09 |
| 7 | 54.676 | 2.20 | 1.84666 | 23.8 | 49.13 |
| 8 | 47.526 | 1.22 | | | 47.37 |
| 9 | 55.346 | 7.65 | 1.48749 | 70.2 | 47.31 |
| 10 | 1833.147 | (variable) | | | 46.11 |
| 11 | −401.208 | 1.40 | 1.80400 | 46.6 | 34.13 |
| 12 | 38.875 | 6.37 | | | 32.30 |
| 13 | −92.113 | 1.34 | 1.48749 | 70.2 | 32.44 |
| 14 | 39.755 | 5.23 | 1.85026 | 32.3 | 33.61 |
| 15 | 292.638 | 4.06 | | | 33.53 |
| 16 | −71.105 | 4.46 | 1.84666 | 23.8 | 33.56 |
| 17 | −36.898 | 1.00 | 1.72000 | 46.0 | 34.09 |
| 18 | 311.857 | (variable) | | | 35.08 |
| 19 | 141.625 | 3.59 | 1.71300 | 53.9 | 35.92 |
| 20 | −238.303 | 0.15 | | | 36.12 |
| 21 | 431.096 | 5.95 | 1.49700 | 81.6 | 36.23 |
| 22 | −48.826 | 1.00 | 1.85026 | 32.3 | 36.30 |
| 23 | −140.339 | (variable) | | | 36.87 |
| 24 | 81.141 | 3.98 | 1.80400 | 46.6 | 37.24 |
| 25 | 19006.920 | 1.15 | | | 36.96 |
| 26(stop) | ∞ | 15.08 | | | 36.64 |
| 27 | 45.384 | 7.49 | 1.49700 | 81.6 | 31.66 |
| 28 | −839.909 | 5.33 | 1.62588 | 35.7 | 29.72 |
| 29 | 39.178 | 23.47 | | | 26.68 |
| 30 | 139.400 | 5.78 | 1.50378 | 66.8 | 25.86 |
| 31 | −105.607 | 7.43 | | | 26.94 |
| 32 | −40.699 | 1.00 | 1.80100 | 35.0 | 28.35 |
| 33 | −79.231 | 0.15 | | | 29.36 |
| 34 | 115.417 | 4.09 | 1.83400 | 37.2 | 30.71 |
| 35 | −493.918 | (variable) | | | 31.15 |
| Image plane | ∞ | | | | |

Various kinds of data
Zoom ratio 2.67

| | Wide-angle | Intermediate | Telephoto |
|---|---|---|---|
| Focal length | 72.49 | 99.90 | 193.91 |
| F-number | 2.90 | 2.90 | 2.90 |
| Angle of field | 16.59 | 12.20 | 6.36 |
| Image height | 21.60 | 21.60 | 21.60 |
| Total lens length | 243.50 | 243.51 | 243.49 |
| BF | 52.10 | 52.11 | 52.08 |
| d 6 | 8.38 | 11.42 | 33.14 |
| d10 | 1.59 | 10.49 | 16.84 |
| d18 | 30.54 | 23.46 | 1.50 |
| d23 | 11.11 | 6.25 | 0.15 |
| d35 | 52.10 | 52.11 | 52.08 |
| Entrance pupil position | 96.84 | 140.42 | 236.01 |
| Exit pupil position | −81.71 | −81.71 | −81.71 |
| Front side principal position | 130.06 | 165.74 | 148.88 |
| Rear side principal position | −20.39 | −47.79 | −141.83 |

Zoom lens unit data

| Unit | Start surface | Focal length | Lens configuration length | Front side principal position | Rear side principal position |
|---|---|---|---|---|---|
| 1 | 1 | 179.99 | 19.21 | 2.38 | −10.26 |
| 2 | 7 | 155.92 | 11.07 | −0.28 | −7.84 |
| 3 | 11 | −27.99 | 23.86 | 4.82 | −11.76 |
| 4 | 19 | 124.89 | 10.69 | 0.62 | −6.15 |
| 5 | 24 | 86.42 | 74.95 | 21.42 | −59.06 |

Single lens data

| Lens | Start surface | Focal length |
|---|---|---|
| 1 | 1 | −265.43 |
| 2 | 3 | 128.02 |
| 3 | 5 | 647.74 |
| 4 | 7 | −499.75 |
| 5 | 9 | 116.90 |
| 6 | 11 | −44.02 |
| 7 | 13 | −56.78 |
| 8 | 14 | 53.60 |
| 9 | 16 | 85.48 |
| 10 | 17 | −45.77 |
| 11 | 19 | 125.08 |
| 12 | 21 | 88.61 |
| 13 | 22 | −88.51 |
| 14 | 24 | 101.34 |

-continued (EMBODIMENTS 3 and 4)
Unit [mm]

| 15 | 27 | 86.88 |
| 16 | 28 | −59.67 |
| 17 | 30 | 120.22 |
| 18 | 32 | −105.70 |
| 19 | 34 | 112.52 |

TABLE 1

| | CONDITIONAL EXPRESSION(6) | CONDITIONAL EXPRESSION(7) | CONDITIONAL EXPRESSION(8) |
|---|---|---|---|
| EMBODIMENT 1 | 0.57 | 0.96 | 0.50 |
| EMBODIMENT 2 | 0.08 | 1.06 | 1.55 |
| EMBODIMENT 3 | 0.30 | 1.00 | 0.91 |
| EMBODIMENT 4 | 0.30 | 1.00 | 0.91 |

This application claims the benefit of Japanese Patent Application No. 2011-052352, filed on Mar. 10, 2011, which is hereby incorporated by reference herein in its entirety.

What is claimed is:

1. An image pickup apparatus comprising:
an image pickup element;
a lens unit configured to collect a ray from an object on an image-side conjugate plane; and
a lens array that includes a plurality of lens cells,
wherein the lens array is disposed so that the image-side conjugate plane and the image pickup element are conjugate to each other, and
wherein the following expression is met:

$$0.05 < \left|\frac{\sigma_1}{P_{ex}}\right| < 0.95$$

where $\sigma_1$ is a distance from an object-side principal plane of the lens array to the image-side conjugate plane, and $P_{ex}$ is a distance from an exit pupil of the lens unit to the image-side conjugate plane.

2. The image pickup apparatus according to claim 1, wherein the lens array is disposed so that pixels imaged on the image-side conjugate plane by adjacent lens cells are shifted each other by a length different from an integer multiple of a pitch of the imaged pixels when the pixels of the image pickup element are imaged on the image-side conjugate plane by the lens cells.

3. The image pickup apparatus according to claim 1, wherein the following expression is met:

$$0.9 < \frac{M}{m}\mathrm{mod}\left(\left|\frac{\Delta_{LA}\sigma_2}{\Delta\sigma_1}\right|, 1\right) < 1.1$$

where $\sigma_2$ is a distance from an image-side principal plane of the lens array to the image pickup element, $\Delta$ is a pixel pitch of the image pickup element, $\Delta_{LA}$ is a pitch of the lens array, M is an integer that meets the following expression:

$$0.2 < \frac{M}{1 + |\sigma_1/\sigma_2|} < 2.0$$

and m is an integer that is smaller than M and the greatest common factor of m and M is 1.

4. The image pickup apparatus according to claim 1, wherein an image-side surface of the lens cell has a convex shape.

5. The image pickup apparatus according to claim 1, wherein an object-side surface of the lens cell has a plane or a convex shape.

6. The image pickup apparatus according to claim 1, wherein the lens array is disposed at an object side relative to the image-side conjugate plane of the lens unit.

7. An image pickup optical system that collects a ray from an object on an image pickup element, comprising:
a lens unit configured to collect the ray from the object on an image-side conjugate plane; and
a lens array that includes a plurality of lens cells,
wherein the lens array is disposed so that the image-side conjugate plane and the image pickup element are conjugate to each other, and
wherein the following expression is met:

$$0.05 < \left|\frac{\sigma_1}{P_{ex}}\right| < 0.95$$

where $\sigma_1$ is a distance from an object-side principal plane of the lens array to the image-side conjugate plane, and $P_{ex}$ is a distance from an exit pupil of the lens unit to the image-side conjugate plane.

* * * * *